United States Patent [19]
Pufahl

[11] 4,276,107
[45] * Jun. 30, 1981

[54] ADHESIVE-COATED IMPREGNATED POLYURETHANE FOAM

[76] Inventor: Joseph Pufahl, 10 Baer La., Locust Valley, N.Y. 11560

[*] Notice: The portion of the term of this patent subsequent to Sep. 25, 1996, has been disclaimed.

[21] Appl. No.: 25,835

[22] Filed: Apr. 2, 1979

Related U.S. Application Data

[60] Division of Ser. No. 860,156, Dec. 14, 1977, Pat. No. 4,169,184, which is a continuation-in-part of Ser. No. 357,626, May 7, 1973, abandoned.

[51] Int. Cl.³ ............................................. B05D 5/10
[52] U.S. Cl. ................................... 156/238; 156/247; 427/208.8; 427/244; 427/322; 427/346; 427/365
[58] Field of Search .................... 427/207, 208, 208.8, 427/244, 322, 346, 365; 428/40–42; 156/238, 23, 247, 289

[56] References Cited

U.S. PATENT DOCUMENTS

| | | | |
|---|---|---|---|
| 2,848,355 | 8/1958 | Bartell | 428/354 |
| 3,087,850 | 4/1963 | Cole | 427/207 X |
| 3,665,918 | 5/1972 | Lindquist et al. | 428/160 X |

Primary Examiner—Bernard D. Pianalto
Attorney, Agent, or Firm—Graham, Geoffrey & Reardon

[57] ABSTRACT

A method of making a pressure-sensitive adhesive tape comprising a substrate formed of high-density, flexible, open-cell polyurethane foam impregnated with a chlorine-containing elastomer and coated with a pressure-sensitive adhesive.

9 Claims, 2 Drawing Figures

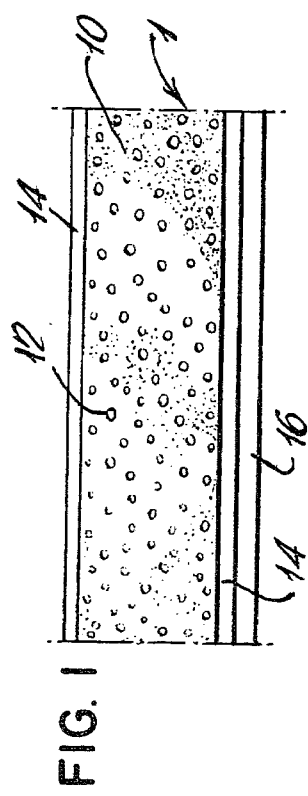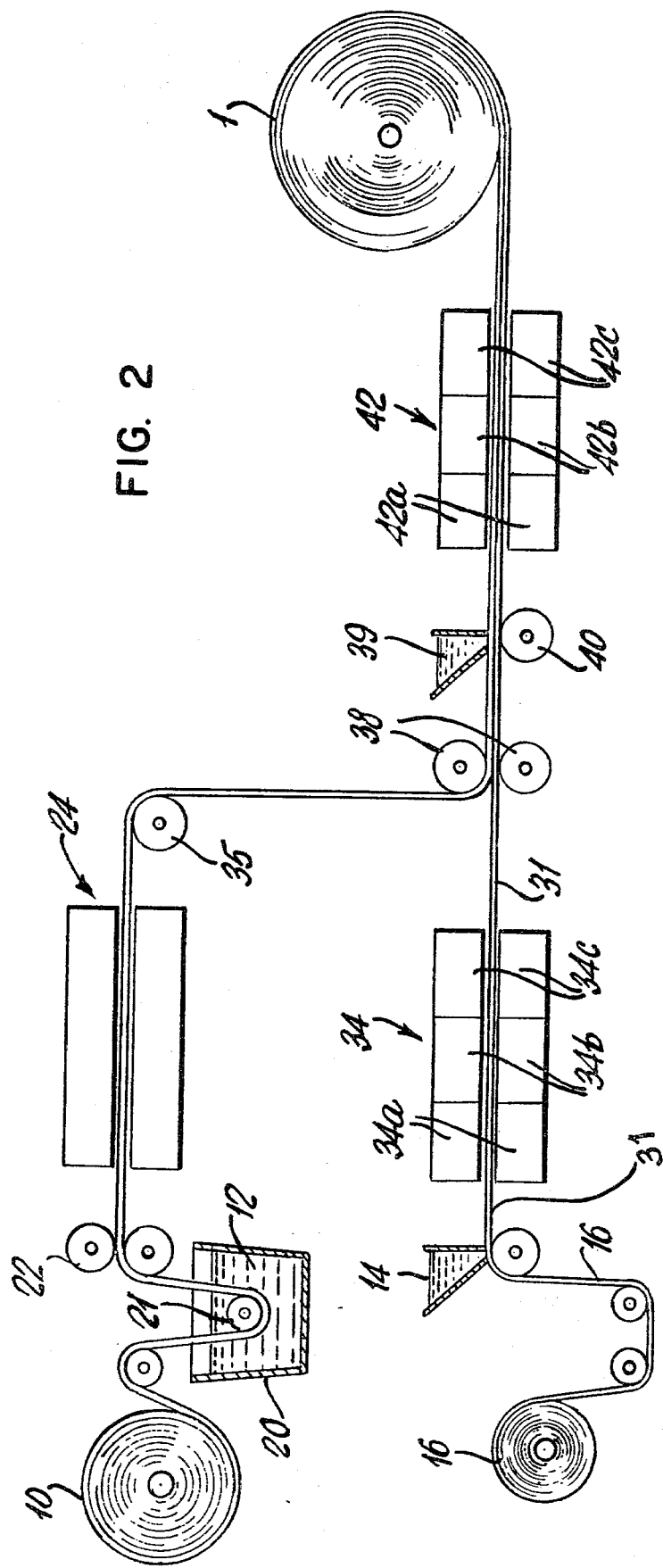
FIG. 1
FIG. 2

ADHESIVE-COATED IMPREGNATED POLYURETHANE FOAM

This application is a divisional of copending application Ser. No. 860,156 filed Dec. 14, 1977, U.S. Pat. No. 4,169,184; this latter application is a continuation-in-part of copending application Ser. No. 357,626 filed May 7, 1973, now abandoned, by the applicant herein.

This invention relates to pressure-sensitive adhesive sheet material that has improved resistance to various solvents, weather, aging, and fire, and that is useful in the bonding of various materials, one to the other.

The present invention thus involves the formation of adhesive tapes, to one surface of which may be applied decorative materials, such as plastic moldings, or other materials and the opposite surface of which will adhere to uncoated, coated or paint metallic surfaces of, illustratively, an automobile.

Heretofore, pressure-sensitive adhesive formulations, while effective as adhesives, have been known to be of reduced resistance to fire and have also been known to deteriorate readily when exposed to gasoline, oil, grease and hydrocarbon solvents present, by way of illustration, in and about automobiles and other areas of use. More recently, milled combinations of neoprene, a urethane gum elastomer, and a chlorinated diphenyl or triphenyl have been suggested to alleviate certain of these difficulties, the combination being disposed on conventional backing tape prior to use in the wrapping of cable and the like. Unfortunately, these latter tapes, despite any improvements in solvent or fire resistance that they may possess, have aging and weathering properties which can be enhanced, at least in part, only by the inclusion of carefully metered amounts of expensive ultra-violet absorbers, anti-oxidants and other additives delicately balanced against, inter alia, the chlorine content of the polyphenyl utilized. Further, while neoprene has been used as a base for imparting increased solvent and flame-resistance to certain permanent bonding adhesives, their use has been limited by the tendency of the neoprene to crystallize where present in a continuous phase; and because of its brittleness at reduced temperatures.

A compressed, soft, drapeable, breathable, absorbent tape composed of a polyurethane foam infused with impregnants that include acrylic latex binders and thermoplastic polyurethanes in emulsion or solution form to accommodate the planes of weakness that result from compression is disclosed in Lindquist U.S. Pat. No. 3,665,918.

A cushioning, heat insulating or sound absorbing polyurethane foam is suggested in Kumasaka et al. U.S. Pat. No. 3,737,400 in which, as a flame suppressant composition, ammonium sulfate or aluminum hydroxide hydrate, and one or more of $KCl$, $K_2SO_4$, $KNO_3$, $Ca(OH)_2$, $Mg(OH)_2$ and $Ba(OH)_2$, is impregnated or upon which, as suggested in an incidental disclosure, the foregoing composition, incorporated in a suitable binder such as polychloroprene or polyvinylidine chloride latex, is coated.

Dunlap U.S. Pat. No. 2,905,584 suggests incorporating an elastomeric polymer such as butadiene-acrylonitrile, butadienestyrene, natural rubber, butyl rubber, polychloroprene, vinyl chloride, alkyl acrylates, etc. into a slurry of cellulosic fibers; precipitating the elastomeric fibers onto the fibers by adding to the slurry a water-soluble polymer such as the reaction product of a guanidine salt with an aldehyde under basic-conditions; forming a sheet of the fibers as modified by conventional paper-making techniques; removing water from the sheet and treating the sheet with a water-soluble "resinous polymer" formed by reaction of an aldehyde with urea, melamine, phenol or a mixture thereof. The patent states (Col. 3) that the ratio of resinous polymer added to the sheet may be varied, but that if the elastomeric or rubbery polymer content is too high, difficulty in incorporating the resinous polymer, i.e. the aldehyde-containing resin, results in "undesirable qualities."

Bartell U.S. Pat. No. 2,253,922 treats an open, porous, saturable paper web with an aqueous dispersion including an elastomeric copolymer of acrylonitrile together with a minor amount of water-dispersible or water-soluble heat-advancing phenolic-aldehyde resin, which is then cured by heating to form backing sheets for pressure-sensitive adhesives. Other polymers or copolymers of the elastomeric type such as butadiene-styrene, natural rubber, vinyl chloride, copolymer of vinyl chloride with other monomers such as vinyl acetate, vinylidene chloride, chloroprene and similar compatible elastomeric polymers may be blended with the nitrile copolymer and reactive phenolic resin, the patent notes, without impairing their desirable interaction.

Another impregnated product is described in Van Cleef U.S. Pat. No. 2,253,933 in which there is applied to one (or "first") side of a paper base strip, a protective coating in the form of a thick, viscous rubber composition with a solvent and vulcanizing agent for the rubber. The coating is heated to evaporate the solvent. There is then applied to the opposite face of the base strip an aqueous rubber latex dispersion including a vulcanizing agent for the rubber of the latex, in such manner that it penetrates through the strip to the first side thereof; and forms a bond between the coating applied to the first side of the base strip and the base strip itself. The water of the aqueous latex dispersion is evaporated and the coating and rubber of the impregnant latex are vulcanized. A coating of a permanently tacky rubber base pressure sensitive adhesive is applied to a final step to the side of the cellulosic fibrous base strip through which the aqueous latex dispersion is introduced. The method so employed provides voids and air pockets in the base strip.

None of the foregoing backing strips or tapes, however, impregnated, provides an adhesive laminate composed of a pressure-sensitive adhesive resin disposed on both surfaces of a strong, permanent ply or base, which in combination, when applied, illustratively, to an uneven metal base, will absorb the unevenness so that it is not reflected by way of further illustration, in a malleable metal trim applied to the opposite and outer surface of the adhesive laminate. If such a tape could be provided, which would, at the same time be characterized by an extraordinary resistance to weathering, including ultra-violet radiation, aging in a broad temperature range, non-absorbency and effective solvent resistance, a significant step forward in the art would be effected.

In accordance with the present invention, therefore, means are provided for producing a continuous, self-sustaining, pressure-sensitive resilient adhesive tape, one or more, and most desirably both, surfaces of which provide a strong and permanent bond for a variety of materials, such as thermoplastic or thermosetting resins, enamelled or ceramic materials, metals and painted or coated metals or other conventional surfaces. The adhesive tape of the invention includes a uniform substrate of open celled, high density, flexible urethane foam impregnated with a vulcanized polychloroprene elastomer derived from a latex; and in which the substrate is coated with pessure-sensitive adhesive.

More particularly, the sheet material or tape so provided has improved fire and oil resistance, and enhanced weathering and aging characteristics, including significant resistance to oxidation and ultra-violet radiation. In addition, when used in appropriate thickness, in accordance with the invention, the tape will prevent a malleable metal, such as aluminum, for example, applied to one surface of the adhesive sheet from reflecting any unevenness of, or in the metal to which the opposite surface of the adhesive is thereafter applied. The pressure sensitive adhesive tape of the invention is accordingly possessed of significant inherent resilience and flexibility.

Further, the tape provided herein manifests other significantly enhanced physical properties, such as, illustratively, improved tensile strength, elongation, and elasticity while substantially eliminating the undesired solvent retention characteristics of tapes known heretofore. Thus, the tapes produced according to the invention are significantly non-absorbent and solvent-resistant. Illustrative solvents to which these tapes, designed for use in and around automobiles, are particularly resistant, include gasoline, oil, greases and hydrocarbon solvents.

The present invention, however, both as to its organization and mode of preparation, together with further features and advantages thereof, is, for purposes of illustration and description, exemplified in the preferred embodiment of the accompanying drawing forming part of the specification, wherein:

BRIEF DESCRIPTION OF THE DRAWING

FIG. 1 is a sectional view of the laminated adhesive sheet prepared according to the present invention;

FIG. 2 is a semi-diagrammatic illustration of one method for making the product of FIG. 1 according to this invention.

DESCRIPTION OF THE PREFERRED EMBODIMENT

Referring more particularly to the drawing, there is shown in FIG. 1, the laminate product 1 comprising a self-sustaining, continuous substrate or sheet material of high density flexible, resilient, open-cell polyurethane foam 10, having a reduced pore size and impregnated with a polychloroprene elastomer 12 and coated with a pressure sensitive acrylic resin adhesive 14. The adhesive 14 is, in the preferred embodiment of FIGS. 1 and 2, disposed on both outer surfaces of the substrate 10; and release tape 16, both surfaces of which are coated with a standard release composition, such as silicone, is, in turn, attached to the outer surfaces of the adhesive 14. The assembled, impregnated and coated product or tape can then be rolled upon itself in a manner well known and utilized by those skilled in the art to which this invention pertains for better preservation of the tacky properties of the acrylic resin adhesive in the distribution and marketing stages prior to actual use for the purpose for which it is designed. The product of this invention may be preserved in this rolled form, ready for immediate use, for extended periods of time without deterioration or aging. It will be obvious as well to those acquainted with the field that the use of release tape 16 on either or both surfaces of the adhesive 14 or the application or acrylic resin adhesive to more than one surface of the impregnated substrate 10 is not critical to a definition of this invention.

A method for producing the products 1 of FIGS. 1 and 2 in accordance with a preferred embodiment of this invention is shown in FIG. 2 using the apparatus shown semi-diagrammatically therein, wherein a continuous length of self-sustaining, high-density, open-cell, flexible resilient polyester urethane foam, is passed through means for impregnating a chlorine-containing polymeric latex 12 into the foam. In the preferred embodiment of FIG. 2 the deposition and impregnation of latex, and specifically, a chloroprene latex, 12 is accomplished in an impregnation bath 20 into which the substrate is passed about the guide rolls 21. Alternative means, such as knife coaters or roll coaters, may also be used although knife coaters, particularly, are less preferred with compositions having the viscosity of the desired chlorine-containing elastomers. The substrate 10, with adsorbed latex 12 is next passed between means for effecting compression of the substrate 10. This compression is accomplished conventionally by a pair of nip or squeeze rolls 22 which tend to contract the cell orifices on the broad opposed surfaces of the substrate in contact with the squeeze rolls 22 while expanding the orifices of the cells exposed on the sides of the substrate 10. It is noted in this context that "surfaces" of the substrate 10, as referred to herein, unless otherwise expressly indicated, mean the broad surfaces extending across the greater width of the foam, as opposed to the brief lateral dimensions corresponding generally to the thickness of the substrate 10. It is noted also that the term "microcellular" as employed herein refers to cells within the foam that are too small to be seen normally with the unaided human eye.

The substrate is desirably compressed in this step to between one-third to two-thirds, and preferably to about one-half, its normal thickness before or after compression and in the relaxed state. Thus, the foam recovers its original dimensions after compression, but with the polychloroprene investing itself throughout the substrate. Upon leaving the squeeze rolls 22, the impregnated foam is passed through curing means 24 to effect curing and cross-linking of the invested latex to form the chloroprene elastomer introduced into the foam 10. Any excess solvent and low molecular weight polymer and the like that are present are evaporated off at this stage, as well. For this purpose a conventional curing oven 24, normally a forced air drier, is used, as indicated in FIG. 2, wherein the impregnated substrate is maintained for a period of two to four, and preferably three, minutes at a temperature within the range of 225° F. to 300° F., and preferably about 250° F. The upper temperatures that can be employed are in fact, limited only by the point at which degradation of the foam or elastomer components will occur. Obviously, the longer the term in which the substrate 10 is maintained in the oven 24, the lower the temperature desirably employed within the foregoing range and conversely the shorter the term the higher the temperature. In like manner, the thinner the substrate, the shorter the residence time that is required. This principle is also applicable with respect to the curing time of the adhesive hereinafter described; and which may occur approximately simultaneously with, but separately from, the curing of the elastomer 12 in the foam substrate 10.

While the thickness of the foam may be varied as desired, consistent with the use intended, a desirable range for most applications has been found within fifteen mils (0.015 inch) to thirty-five mils (0.035 inch), and more desirably from eighteen mils (0.018 inch) to twenty-two mils (0.022 inch). Particularly preferred is a thickness of about 18 mils.

The preferred range of thicknesses recited has particular utility where employed in forming a tape for attachment to a relatively uneven base; and most particularly where the material to be attached to the outer surface of the tape is malleable and most flexible and is to be attached to a relatively inflexible uneven coated or uncoated metallic base. Using the laminate tape product 1 of this invention, the plastic or metallic molding to be attached, for example, vinyl or aluminum door-guard moldings for use on automobiles, can be applied to the steel or painted metal base of the auto door frame without reflecting unevenness present in the base. The adherence of the aluminum moldings achieved according to the invention is however firm, close and permanent. Other illustrative applications for use of the adhesive sheet material of the invention will be evident to those skilled in the art, as, for example, with die case ornaments and the like. Materials, in addition to aluminum, which can be bonded using the adhesive tape or sheet material of this invention are, illustratively, thermoplastic and thermosetting resin films and fabrics (for example, polyethylene, polyvinylidene chloride, polyvinyl chloride, polyamides, orlon, glass fabrics, Bakelite resins and the like) and duralumin, mild and stainless steel, cast iron, Monel metal, phosphor, bronze and brass.

The acrylic resin adhesive 14 is first applied to a continuous band of release tape 16 by coating means, such as illustrated by the reservoir 30a and knife coater 30b. The coated release tape designated 31 in FIG. 2 may then be passed through means, for example, a pair of nip rolls (not shown), for securing an even distribution of adhesive 14 on the release tape 16. The disposition of adhesive by the knife coater may be rendered so evenly, however, as to obviate the necessity for such nip rolls, the alternative envisioned in FIG. 2.

The evenly coated release tape is then passed to heating means 34. The heating means 34 is usually a forced air drier divided into three zones, a first zone 34a (in which excess solvent is flashed off), maintained at a temperature of about 125° F. to 250° F. and preferably about 150° F., and any substantially unpolymerized or low molecular weight polymer present in the resin is evaporated. The residence time of the adhesive in the first zone or portion 34a of the drier is usually about two to three minutes, but can be varied in the manner described above with respect to the curing oven 24 used for curing of the elastomer 12. The adhesive-coated release tape 31 is then passed through a transitional heating zone 34b of the drier in which the temperatures are elevated to a range of about 175° F. to 275° F. to effect a gradual accommodation of the adhesive to the temperature of the third or curing zone or oven 34c, in which the temperature is maintained at about 250° F. to 300° F. and preferably near the top of this latter range. The acrylic polymer on, for example, conventional silicone coated release paper, passes through the transition zone 34b in a period of about two to three minutes and through the curing zone 34c in an additional period of about two to four minutes, where, as indicated, curing or cross-linking of the polymer is effected. The adhesive coated release tape 31 is then transmitted for deposition of the cured adhesive upon the under-surface of the substrate 10. The adhesive-bearing surface of the coated tape 31 is adapted to contact the substrate 10, which is passed from the curing oven 24 about the guide roll 36, and is compressed against it at, and by, the nip rolls 38. The thickness of the cured adhesive as applied to the foam substrate is normally in the range of two to four mils and preferably from about 2.5 to 3.5 mils. Adhesive 14 is thereafter desposited directly upon the upper surface of the impregnated and cured substrate 10 from a second adhesive deposition means, such as the reservoir 39a and knife coater 39b illustrated in FIG. 2 in combination with the guide roll 40, after which the newly deposited adhesive composition, impregnated substrate 10 and release paper bearing the cured adhesive is passed through a forced air drier 42 incorporating an initial evaporative zone 42a, a second transitional zone 42b, and a curing zone or oven 42c, identical, desirably, to that 34 with its subdivisions 34a, 34b, and 34c, respectively, earlier utilized in curing of the adhesive 14 deposited upon the under surface of the release tape 16. The deposition and curing of this second adhesive coat is carried out usually in a manner identical to that employed in curing of the adhesive upon the release tape. The cured and coated laminate is then wound upon itself in conventional manner to provide a coherent roll of product 1 which is then ready to be unwound for use as desired. At convenient intervals, the product 1 can be slit into individual lengths and widths of stock for distribution and marketing as desired. Where inflexible release tape is used, or, optionally, where a molded substrate 10 is employed, the winding and rolling of the product 1 may simply be omitted and a release tape is applied to the adhesive of the upper surface of the tape before cutting and slitting of the product is undertaken. The foregoing assembly means for production of the product 1 is energized by conventional means obvious to those skilled in the art. Conventional batch methods, as well as continuous procedures, such as that described above, may be used for producing the product envisioned by the invention.

It will be evident that while less preferred, curing of the polychloroprene in the foam and the acrylic resin adhesive on the foam can be accomplished after deposition of the adhesive on the foam. This method leads to the use of superfluous amounts of acrylic resin adhesive, however, not necessary to effective use of the foam product for its intended purpose.

The polymeric urethane foams, chloroprene latex and pressure sensitive acrylic resin adhesives employed in the practice of the invention are individually well known to those skilled in the art as is their method of preparation, and will not require extensive discussion.

Thus, as indicated hereinabove, the foam substrates employed in the practice of this invention are high-density, open-celled, flexible, resilient foams of reduced cell diameter, prepared using, most desirably, polyester urethane resins, although polyether urethane resin foams are also within the ambit of this invention.

The polyurethanes used in preparing the desired foams are formed from a variety of compounds, those widely used commerically involving the reaction of di- or poly-functional hydroxyl compounds, e.g. hydroxyl-terminated polyesters or polyethers with di- or poly-functional isocyanates.

The polyesters used in preparing the preferred polyurethanes of this invention are, in general, produced by condensation of aliphatic dibasic acids, or their anhydrides, such, illustratively, as adipic acid or dimerized linoleic acid manufactured by Emery Industries and designated "Dimer Acids", with monomeric glycols and triols, for example, ethylene glycol, polyethylene glycol, and trimethylolpropane. Small amounts, e.g. up to 10 percent by weight of polyester, of aromatic dibasic acid or corresponding anhydride, such as phthalic anhydride, may be incorporated in the preparation of the polyester.

The less preferred polyethers are prepared, by way of illustration, by the base catalyzed addition of alkylene oxides, such as, for example, propylene oxide, butylene oxide, or combinations thereof, to di- or poly-functional alcohols, for example, the diols, e.g. proplyene glycol; triols, e.g. glycerol, trimethylolpropane. Small amounts, e.g. up to about 10 percent by weight of polyol present, may be a tetrol such as pentaerythritol. Normally, a mixture of diols and triols are used in preparing the polyether urethanes suitable for the practice of this invention.

The isocyanates generally employed in the preparation of either polyester or polyether flexible urethanes for use herein are tolylene diisocyanate, 4,4'-diphenylmethane diisocyanate, and modifications of these compounds.

The foregoing polyurethanes are prepared as foams for use herein normally by either the "prepolymer" or "one-shot" process, as these methods are known to those skilled in the art.

In the prepolymer process a polyester or polyether is reacted with a diisocyanate prior to foaming, employing an excess of isocyanate. The result, an isocyanate-terminated prepolymer, is then ordinarily reacted with water, with consequent formation of the urethane polymer and generation of carbon dioxide within the reaction mass. In the "one-shot" process, the foam is formed by admixture of the reaction components simultaneously, using a metaloorangic catalyst, for example, stannous octoate, or less frequently, tertiary amines, as by way of illustration, N-ethyl morpholine or N,N,N',N'-tetramethyl butane diamine. Other catalyst systems are also available for this purpose. The carbon dioxide, or other blowing agent, induces the formation of bubbles of approximately spherical configuration, in the plastic polymer mass. These bubbles assume thereafter a polygonal configuration in which the cells are defined and supported by a three-dimensional network of interconnecting ribs and are separated from one another by a thin film of polymer known as the cell membrane. This film or membrane is often absent to a significant degree due to rupture in the foaming step, resulting in the well-known property designated as "open-cell" or "open-celled" in which about seventeen percent (17%) or more of the cell membranes are absent as a result. It is imperative that the foam utilized herein be open-celled to permit impregnation by the chloroprene elastomer. Thus, the foams employed herein should be "open-cell" to the extent that about 17% to about 40%, and operatively, and, in a preferred embodiment, up to about 82%; and indeed within the pore size as defined by density employed within the practice of the invention, up to 98% and even 100% of the cell membranes, are absent or ruptured, thus including, in a particularly preferred embodiment, reticulated foams. The percentage of open-cell membranes is determined in accordance with ASTM D-2856 using an Air Comparison Pycometer Model No. 930 manufactured by Beckman Instruments.

The sheet material 10 employed herein has, in addition, a high density within the range of twenty (20), or twenty-five (25) and preferably about thirty (30), and most desirably forty (40), pounds per cubic foot, and indeed up to sixty (60) pounds per cubic foot. Density is determined in each instance of its use herein by ASTM Procedure D-1564-71. High density is correlative to reduced cell size. Therefore, to secure a density such as recited the cells must be of reduced cell size. A preferred foam is that which has been designated by the term, "compressed", as well. A desirable foam for use in the practice of the invention has been that available under the trade name "Scott Compressed Foam" from Scott Paper Company, Philadelphia, Penn. Whether compressed in formation of the foam or not, the product foam is further compressed during impregnation and relaxed as described elsewhere herein. Usually, catalyst, surfactants, and the amount of water present provide the means in both the prepolymer and one-shot processes for regulation of the foaming rate and cell size. The amount of water used in the reaction will accordingly determine the foam density; and to some extent the hardness of the foam. However, in order to achieve the minimal size required in the cells of the foam employed herein, minimal water and surfactant are employed in formulation of the foam; a low-boiling flourocarbon, for example, trichlorofluoromethane, being preferred as the principal or sole blowing agent, rather than the carbon dioxide generated in the foaming step by the reaction of water with free isocyanate groups.

Further disclosure with respect to the flexible, open-celled polyester, as well as polyether, urethane foams used herein and their method of preparation appear in Saunders and Frisch, *High Polymers*, Vol. XVI, *Polyurethanes, Chemistry and Technology*, Part I, *Chemistry*, and Part II, *Technology*, Interscience Publishers, (Fourth Printing 1969); and Paul F. Bruins, *Polyurethane Technology*, Interscience Publishers (1969).

The chlorine-containing polymers used in impregnation of the foam substrate are chloroprene latexes and particularly fast curing chloroprene homopolymers. The polychloroprenes, or neoprenes (as they are also commonly designated) used according to the invention, are anionic chloroprene homopolymeric latexes having preferably an initial pH of about 12. They are extremely viscous, having a Mooney viscosity of about 200 (MS 2.5 min., 212° F.) and are of the gel type. Typical of these latexes are Neoprene 571, 842A and 601A sold by E. I. du Pont de Nemours, Wilmington, Del. These latexes are further characterized by a solids content by weight of approximately 50 percent to 60 percent and preferably about 50 percent. The specific gravity of these latexes is within the range of 1.10 to 1.12, and of the polymer, 1.23. The preferred specific gravity of the latex is 1.12. The Brookfield viscosity of these latexes may vary from 8, and preferably, 23 to 250 centipoises; the latter is, however, preferred. The latexes employed herein are further characterized by an average surface tension of 38 to 39 dyn/cm. and preferably 39 dyn/cm. The preferred latex for use in the practice of the invention is Neoprene 601A.

The latexes are treated prior to use with one or more conventional mixtures of stabilizers preservatives, thickeners and antifoaming agents, as desired.

The mechanism of curing or vulcanization of neoprene differs from that of other elastomers. This is illustrated by the capacity of neoprene normally to be cured by heat alone. However, combinations of zinc and magnesium oxides in ratios by weight of 5 to 4 repectively, or zinc oxide or magnesium oxide, alone, are used as curing agents within the purview of this invention and included in the impregnating neoprene composition applied to the foam substrate. Indeed, these additions are considered necessary, and 3 to 5 parts of such additives, preferably zinc oxide, per hundred parts of chloroprene polymer are normally and most desirably utilized according to the practice herein described. Additional additives, particularly antioxidants, the latter in amounts of 3 to 5 parts per hundred parts of polychloroprene, are also present. Illustrative additives most commonly employed are phenyl beta-naphthylamine, the di-o-tolyl guanidine salt of dicatechol borate, antimony trisulfide, ethyl thiourea and 4,4'-diaminodiphenyl methane, ammonium caseinate and polymeric sodium alkyl naphthalene sulfonic acid. Conventional additives and agents, including plasticizers, are thus embraced, as well, within the expression "neoprene" and "polychloroprene" and employed herein.

Further disclosure with respect to suitable additives for latex addition appear in the *Encyclopedia of Polymer Science and Technology*, Vol. 8, pp. 164–195, Interscience Publishers (1968).

Inclusion of the foregoing polychloroprenes in the high-density, open-celled substrate 10 in the manner herein described results in a product which retains its flexibility and resilience at extremely low temperatures while being particularly resistant to crystallization.

The pressure-sensitive acrylic resin adhesive formulation applied to either, and preferably both, surface of the impregnated foam 10, as indicated hereinabove, is most desirably an acrylic resin solution polymer. The term "acrylic resin adhesive", as employed in the practice of this invention, is intended to mean these solution polymers and to include, more particularly, those pressure sensitive adhesive compositions incorporating as the principal adhesive components, resins produced from acrylic acid and acrylic ester monomers and mixtures thereof, and copolymers thereof with other monomers.

Illustrative of these well known resins are those prepared from monomers of the general formula:

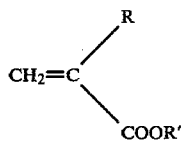

wherein R is H or $CH_3$ and R' is hydrogen or an alkyl radical and preferably a lower alkyl radical containing from 1 to 8 carbon atoms, and mixtures of the foregoing including, preferably, those wherein R' is an alkyl radical of from 1 to 5 carbon atoms.

The foregoing monomers from which the homopolymeric and copolymeric acrylic resins employed herein are prepared are therefore acrylic or methacrylic acid and mixtures thereof.

Illustrative esters include methyl acrylate, ethyl acrylate, isobutyl acrylate, methyl methacrylate, ethyl methacrylate, isopropyl methacrylate, n-pentyl acrylate, and butyl methacrylate. The acids polymerize readily upon heat curing. Aqueous dispersions of acrylate and methacrylate polymers and copolymers with acrylic and methacrylic acid constitute adhesives useful in the practice of this invention. Also useful are methacrylate polymers which are soluble in a wide range of organic solvants such, illustratively, as chloroform, ethylene dichloride, toluene, mixtures of toluene and acetone or the monomer itself. An organic peroxide, such as tert. butyl hydroperoxide, is present normally where the monomer is used as the solvent, so that the solvent monomer itself may be polymerized. Thus, an illustrative adhesive solution having application herein, particularly where adherence to a smooth surface such as aluminum, for example, in automobile moldings is desired, is composed of a solution of methacrylic acid and polymethyl methacrylate in methyl methacrylate monomer, with tert. butyl hydroperoxide catalyst. A similar composition encompassed within the acrylic resin adhesive compositions of the invention incorporates acrylonitrile and styrene with a catalyst such as the foregoing organic peroxide.

Aqueous dispersions of acrylate polymers and copolymers, with or without solutions of acrylic acid polymer, including for the purpose of this discussion, methacrylic acid polymers or copolymers as thickeners are also included within the compass of this invention. Desirable acrylic resin adhesives, as the term is employed herein, include, in addition, known vinyl acetate-acrylic acid copolymer emulsions. Particularly preferred acrylic resin adhesive formulations for use herein include an acrylic resin blend of about five (5) to twenty-five (25) parts, and most desirably, fifteen (15) parts, by weight of AEROSET® 1085 modified acrylic resin polymer, (producted by Ashland Chemical Company, Columbus, Ohio), and 100 parts by weight of National Starch acrylic resin No. 30-219 (manufactured by National Starch and Chemical Corporation, New York, N.Y.) The term "acrylic resin adhesive" and the like, employed herein is intended, in addition, to encompass formulations including the other usual adhesive additives known to those skilled in the art.

The inclusion of an acrylic resin adhesive provides a compatible composition of superior adhesive characteristics and at the same time obviates the necessity of a fire-retardant chlorine-containing, tackifying resin adhesive and the concomitant requirement of a careful balancing of components to achieve the desired physical qualities.

The release tape to which the adhesive is first applied in one embodiment prior to curing and application to the previously impregnated and cured urethane substrate can, and normally is, desirably a silicone-lined paper for particularly easy removal of the adhesive therefrom when desired. However, any tape or substrate to which any acrylic resin adhesive can be bonded and from which its release can be readily secured, can be employed and is well known to those skilled in the relevant art. Illustratively, in addition to cellulosic compositions, such as paper, there are the conventional plastic films made of polyethylene, polyvinyl chloride, and the like; and textile fabrics made from synthetic fibers, for example, polyamides and orlon. It will be evident that a decorative cover tape may be used formed of one or more of these materials to which the properties of quick release have not been imparted and which can, as a result, constitute a product which only requires its application to a wall or other surface. While flexible release backing tapes are preferred, rigid or relatively inflexible backing tapes may be used herein. The winding of the laminated product after preparation for marketing is then omitted; and rigid sections of desired length are simply severed from the product as it is prepared.

Where the laminated product with a release tape is wound upon itself and a single release tape is employed, it bears a release coat on both sides. Where a release tape is applied to both sides of the laminate of the invention, the release tape normally bears a release coating on only the interior surface in contact with the laminate.

The release tape normally employed is made of paper coated with standard release coating such as organopolysiloxane release coatings. A preferred paper of this general type is that sold by Daubert Chemical Co. under the trade name DAUBERT 2-65 KGB. This paper or other release materials well-known to those skilled in the art do not adversely affect the carefully secured properties of the underlying adhesive tape according to the invention in its desired area of use.

The invention is further illustrated by the following examples.

EXAMPLE I

This example illustrates the preparation of resilient pressure-sensitive adhesive tape incorporating an impregnated polyester urethane substrate in accordance with the invention.

A continuous substrate of compressed, flexible, open-cell, polyester urethane foam (Compressed Scott Foam, made by Scott Paper Company, Philadelphia), having a density of about forty pounds per cubic foot in a thickness of about 18 mils is fed into the apparatus of FIG. 2 at about 25 feet per minute and through the bath 20 of said apparatus containing a chloroprene latex composition formed by adding 80 pounds (wet) of Neoprene 601A latex manufactured by E. I. du Pont de Nemours Corp., Wilmington, Del., with 8.7 pounds of a dispersion of additives. The dispersion is formed by mixing 30 lbs of zinc oxide; 10 lbs. of phenyl beta-naphthyl amine, sold as Neozone antioxidant by E. I. du Pont de Nemours Corp.; 2 lbs. of a polymeric sodium alkyl naphthalene sulfonic amine made by R. T. Vanderbilt Co. and sold under the trade name Darvan 16.1; and 10 lbs. ammonium caseinate; with water sufficient to form a mixture which is 50 percent by weight of solids. This mixture is dispersed over a period of twenty-four hours in a ball mill.

The mixture of Neoprene and dispersion are in turn mixed by stirring for a few minutes prior to introduction into the impregnating bath 20.

The impregnated substrate is then passed through a pair of nip rolls indicated by the numeral 22 in FIG. 2. The pressure on the substrate is sufficient to compress it to about one-third to two-thirds of its thickness prior to passage into the rolls. These nip or squeeze rolls are of 80 durometer rubber, 8 inches in diameter, and have a roll pressure on their respective journals of four tons. The impregnated foam recovers its original dimensions after compression, but with the polychloroprene invested substantially throughout the substrate.

Cross-linking or curing of the impregnated substrate is thereafter effected in a curing oven at a temperature of 250°-300° F. for a period of three minutes.

An acrylic resin blend of ten parts by weight AEROSET ® 1085 modified acrylic resin polymer and 100 parts by weight of National Starch acrylic resin No. 30-1219 is deposited upon opposite surfaces of the foregoing impregnated substrate to a thickness of about 2 mils in the apparatus and in the manner described hereinabove, the solvent and unpolymerized monomer are flashed off in a forced air drier at a temperature of about 200° F. for about two to three minutes and passed through a transitional heating zone of increased temperature and into a third zone or curing oven maintained at a temperature of about 300° F. where the adhesive is maintained for about one to two minutes.

The impregnated substrate manifested a tensile strength of 16.4 lb./inch of width, an elongation at break of 400%, an elastic memory of 100%; and solvent retention, using gasoline as a solvent, of 0.02%.

EXAMPLE II

This example illustrates the production of a resilient pressure-sensitive adhesive tape incorporating an impregnated polyether urethane foam substrate in accordance with the invention.

The procedure of Example I is repeated substituting for the polyester urethane foam of Example I, a polyether urethane foam having a density of 20 pounds per cubic foot.

It will be evident from the foregoing that a new pressure-sensitive adhesive sheet material or tape including a novel substrate therefor, has been provided by the present invention. It will be evident, too, that the terms and expressions which have been employed are used as terms of description and not of limitation. There is no intention in the use of such terms and expressions of excluding equivalents of the features shown and described or portions thereof and it is recognized that various modifications are possible within the scope of the invention claimed.

What is claimed is:

1. A process for producing a resilient, non-porous, significantly non-absorbent pressure-sensitive adhesive tape that consists essentially of impregnating a substrate of open-celled, high density, flexible, resilient polyurethane foam with a polychloroprene latex, compressing said latex-impregnated substrate to cause said latex to penetrate through said polyurethane foam and permitting said substrate to return to its pre-compressed state; depositing a layer of a pressure-sensitive adhesive upon said impregnated substrate, and curing each of said polychloroprene and pressure-sensitive adhesive simultaneously or in separate steps.

2. A method as claimed in claim 1, wherein said pressure-sensitive adhesive is an acrylic resin and is deposited upon a release tape and brought into contact with said impregnated substrate whereupon said adhesive is cured thereon.

3. A process as claimed in claim 2, wherein said impregnated substrate is compressed to within a range between one-third to two-thirds of its thickness immediately prior to compression.

4. A process as claimed in claim 3, wherein said compression is effected to about one-half of the thickness of said impregnated substrate in its pre-compressed state immediately prior to compression.

5. A process for producing a resilient, pressure-sensitive adhesive tape that consists essentially of impregnating an open-cell, flexible, polyurethane foam substrate, said foam, prior to impregnation, having a density of 20 pounds per cubic inch to 60 pounds per cubic inch and wherein the open-cell structure thereof as represented by absence of cell membranes is within the range of about 17 percent to about 100 percent, with a polychloroprene latex having a Brookfield viscosity of from 23 centipoises to 250 centipoises, compressing the polychloropreneimpregnated substrate so formed, and permitting said substrate to return to its immediately pre-compressed state; coating the resulting impregnated substrate with an acrylic resin adhesive; and curing said polychloroprene and adhesive thereon simultaneously or in separate steps.

6. A process as claimed in claim 5, wherein said foam, prior to impregnation, has a density of 40 pounds per cubic inch.

7. A process as claimed in claim 5, wherein said latex has a specific gravity of from 1.10 to 1.12 and a solids content by weight of 50 percent to 60 percent.

8. A process as claimed in claim 5, wherein said impregnated polychloroprene is initially cured; said coating of acrylic resin adhesive is deposited upon said impregnated substrate and said adhesive is thereupon cured.

9. A process as claimed in claim 5, wherein said pressuresensitive adhesive is an acrylic resin.

* * * * *